US010551963B2

(12) United States Patent
Sakamoto et al.

(10) Patent No.: US 10,551,963 B2
(45) Date of Patent: Feb. 4, 2020

(54) TOUCH PANEL WITH MESH ELECTRODES TO MITIGATE MOIRE, AND DISPLAY DEVICE COMPRISING SAME

(71) Applicant: VTS-Touchsensor Co., Ltd., Higashiomi-shi, Shiga (JP)

(72) Inventors: Taro Sakamoto, Tokyo (JP); Takahiro Harada, Tokyo (JP)

(73) Assignee: VTS-Touchsensor Co., Ltd., Higashiomi-shi, Shiga (JP)

( * ) Notice: Subject to any disclaimer, the term of this patent is extended or adjusted under 35 U.S.C. 154(b) by 0 days.

(21) Appl. No.: 16/173,197

(22) Filed: Oct. 29, 2018

(65) Prior Publication Data

US 2019/0129568 A1    May 2, 2019

(30) Foreign Application Priority Data

Oct. 30, 2017 (JP) .................................. 2017-209143

(51) Int. Cl.
*G06F 3/041* (2006.01)
*G06F 3/047* (2006.01)
*G06F 3/044* (2006.01)

(52) U.S. Cl.
CPC ............ *G06F 3/0416* (2013.01); *G06F 3/044* (2013.01); *G06F 3/047* (2013.01); *G06F 3/0412* (2013.01)

(58) Field of Classification Search
CPC ................................. G06F 3/044; G06F 3/047
See application file for complete search history.

(56) References Cited

U.S. PATENT DOCUMENTS

| 2009/0096757 | A1 | 4/2009 | Hotelling et al. |
| 2009/0273577 | A1* | 11/2009 | Chen ....................... G06F 3/044 345/174 |
| 2015/0212622 | A1 | 7/2015 | Hirata et al. |
| 2015/0331538 | A1 | 11/2015 | Hashida |

FOREIGN PATENT DOCUMENTS

| JP | 2007-533044 A | 11/2007 |
| JP | 2013-156725 A | 8/2013 |
| JP | 5910761 B2 | 4/2016 |
| WO | 2017/056977 A1 | 4/2017 |

\* cited by examiner

*Primary Examiner* — Laurence J Lee
(74) *Attorney, Agent, or Firm* — McGlew and Tuttle, P.C.

(57) ABSTRACT

A touch panel enabling a repeat arrangement with a small design load, and a mesh pattern with a high degree of freedom and does not generate moiré, and a display device comprising same. A touch panel in which a drive electrode pattern/sensing electrode pattern include: first main electrode wires/second main electrode wires constituting line segments having a linear shape extending along a first wire direction/second wire direction; and first auxiliary electrode wires/second auxiliary electrode wires constituting line segments having a linear shape extending along the second wire direction/first wire direction and joining the first main electrode wires/second main electrode wires, and respective end points of the first main electrode wires/second main electrode wires are connected to end points of the closest first main electrode wire/second main electrode wire in adjacent nodes, by connecting wires having a different angle of inclination from the first main electrode wires/second main electrode wires.

5 Claims, 7 Drawing Sheets

TOUCH PANEL WITH MESH ELECTRODES TO MITIGATE MOIRE, AND DISPLAY DEVICE COMPRISING SAME

CROSS-REFERENCE TO RELATED APPLICATIONS

This application claims priority of Japanese Patent Application Serial No. JP 2017-209 143 filed Oct. 30, 2017, pursuant to 35 U.S.C. 119(a)-(d), the content of which is incorporated herein by reference in its entirety as if fully set forth herein.

FIELD OF THE INVENTION

The present invention relates to a touch panel provided with a plurality of electrodes comprising a plurality of electrode wires, and to a display device comprising same.

BACKGROUND OF THE INVENTION

Touch panel devices are widely used nowadays as an input means. A touch panel device comprises a touch panel sensor, a control circuit for identifying a contact position, wiring and a flexible printed circuit board (FPC). In many cases, a touch panel device is used as an input means for various devices (e.g., smartphones, ticket machines, ATM devices and gaming devices) having an incorporated display device such as a liquid crystal display or an organic EL display. In such devices, the touch panel sensor is disposed on a display panel of the display device, and as a result the touch panel device is able to receive input corresponding to a display image. A region of the touch panel sensor facing the display panel is transparent, and a region in which the contact position (proximity position) can be detected is referred to as an active area.

Touch panel devices fall into various categories based on the principle of detecting the contact position (proximity position). Capacitive coupling touch panel devices have become mainstream in recent times for a number of reasons, including optical brightness, design properties, structural simplicity, and also excellent functionality. In a capacitive coupling touch panel device, when an external conductor (a finger, stylus pen, etc.) for which the position is to be detected is placed in contact (proximity) through a dielectric material, parasitic capacitance produced by the external conductor is newly generated and the electrostatic capacity changes. The position of the external conductor on the touch panel sensor is detected by utilizing this change in electrostatic capacity. Capacitive coupling is further classified as surface or projected and attention is focusing on projected capacitive coupling because of compatibility with multi-touch recognition (multipoint recognition) (e.g., JP 2007-533044 A).

FIG. 5 is a plan view illustrating the configuration of a display device equipped with a touch panel sensor (abbreviated below simply to "display device", as appropriate) according to the prior art. It should be noted that drive electrodes 40 formed on a drive electrode surface 40S and sensing electrodes 50 formed on a sensing electrode surface 50S are shown in FIG. 5 in an exaggerated manner in order to help describe the arrangement of the drive electrodes 40 and the sensing electrodes 50. Furthermore, the drive electrodes 40 and sensing electrodes 50 are formed on one surface each of a transparent dielectric substrate 30, as will be described later, but electrode wires of both are shown in FIG. 5 in order to illustrate the positional relationship thereof.

As shown in FIG. 5, the display device is a laminate in which a touch panel 20 is bonded by means of a transparent adhesion layer on a display panel 10 such as a liquid crystal panel or an organic EL panel, and comprises a drive circuit for driving the touch panel 20. A display surface 10S is defined on a surface of the touch panel 10, and information such as images based on external signals is displayed on the display surface 10S.

The touch panel 20 is bonded by means of a cover layer 22 and a transparent adhesion layer 23. The transparent dielectric substrate 30 which is a constituent element of the touch panel 20 is overlaid in such a way as to cover the whole of the display surface 10S defined on the touch panel 10, and transmits the information displayed on the display surface 10S. The transparent dielectric substrate 30 is formed from a base material such as a transparent glass substrate or a transparent resin film, for example, and it may have a single-layer structure comprising one base material or it may have a multilayer structure in which two or more base materials are stacked.

A surface of the transparent dielectric substrate 30 on the side facing the display panel 10 (the rear side of the page=light source side) is set as the drive electrode surface 40S. A plurality of drive electrodes 40 and a plurality of drive terminal portions 43 are arranged along a Y direction on the drive electrode surface 40S with an interval (inter-drive-electrode region Sd) therebetween. Each of the plurality of drive electrodes 40 has a strip shape extending towards a drive electrode terminal portion 43 along an X direction orthogonal to the Y direction. Each of the drive electrodes 40 is separately connected to a selection circuit 34 via the drive electrode terminal portion 43, and is selected and driven as a result of receiving a signal.

A surface of the transparent dielectric substrate 30 on the opposite side to the display panel 10 (the front side of the page=viewing side) is set as the sensing electrode surface 50S. A plurality of sensing electrodes 50 and a plurality of sensing electrode terminal portions 53 are arranged along the X direction on the sensing electrode surface 50S with an interval (inter-sensing-electrode region Ss) therebetween. Each of the plurality of sensing electrodes 50 has a strip shape extending towards a sensing electrode terminal portion 53 along the Y direction. Each of the sensing electrodes 50 is separately connected to a detection circuit 35 via the sensing electrode terminal portion 53, and the voltage of each sensing electrode 50 is detected.

In FIG. 5, one drive electrode 40 (e.g., ND)/one sensing electrode 50 (e.g., NS) constitute a region in which electrostatic capacity is generated between the sensing electrode/drive electrode lying one over the other when seen in a plan view, and this is referred to as a node. The node constitutes a unit region for detecting an initial value of electrostatic capacity and a change in the electrostatic capacity resulting from contact with a human finger or the like. The size of the node (node size) is around several square millimeters and is expressed by the following equation.

Node size=size of active area of touch panel/number of pins in integrated circuit forming part of the touch panel Furthermore, the display panel 10 comprises a color filter layer 15 in which a black matrix 15a is arranged along the X direction which is the direction of extension of the drive electrodes 40 and the Y direction which is the direction of extension of the sensing electrodes 50, the black matrix 15a having a structure defining a plurality of unit cells. Any of a red colored layer 15R for displaying a red color, a green colored layer 15G for displaying a green color, and a blue colored layer 15B for displaying a blue color is positioned in each unit cell defined by the black matrix 15a. A pixel width Cx along the X direction and a pixel width Cy along the Y direction are set at values commensurate with the resolution etc. of the display device.

Transparent materials comprising a metal oxide film such as zinc oxide, or a composite oxide film of a metal oxide including indium, tin, gallium and zinc etc., such as indium tin oxide (ITO) and indium gallium zinc oxide, are conventionally used for the drive electrodes and sensing electrodes employed in the touch panel sensor, and the material is typically ITO. However, these transparent materials have high resistance so there are problems in that this leads to a reduction in detection sensitivity when such materials are used in a touch panel having a large screen, and it has become necessary to use low-resistance materials. Electrodes having a configuration obtained by trimming a mesh formed by fine metal wires such as copper, aluminum or silver have come to be used as a result (e.g., JP 2013-156725 A).

In addition to being conductive in order to detect a change in electrostatic capacity, each of the plurality of electrodes forming part of the touch panel needs to be able to transmit light in such a way that there is no impediment to a viewer, since an image is displayed on the operating surface of the touch panel. That is to say, if the electrode wires of both the drive electrodes and the sensing electrodes comprise fine metal wires, this leads to a reduction in light transmittance when the surface area occupied by the electrode wires of the drive electrodes and the sensing electrodes increases when seen in a plan view.

In this regard, JP 5910761 B2 proposes a pattern designed by analyzing the pattern of the drive electrodes and the sensing electrodes in such a way that a mesh having rectangular units overall is constructed by placing the drive electrodes over the sensing electrodes when seen in a plan view. That is to say, by combining the pattern illustrated in FIG. 6a in which the drive electrodes 40 are arranged alongside each other, and the pattern illustrated in FIG. 6b in which the sensing electrodes 50 are arranged alongside each other, the mesh pattern shown in FIG. 7 is constructed, where the units have a rectangular shape (squares having one side α).

In FIG. 7, the sensing electrodes 50 (the pattern in FIG. 6b) depicted by line outlines are superimposed on the drive electrodes 40 (the pattern in FIG. 6a) depicted by black lines to construct a mesh pattern having rectangular units overall, and the electrodes, in which five main electrode wires (41, 51) and auxiliary electrode wires (42, 52) connecting the main electrode wires are arranged as a set, are defined by the inter-drive-electrode region Sd and the inter-sensing-electrode region Ss, and nodes N of 3 rows×3 columns are formed. Here, the auxiliary electrode wires of the drive electrodes/sensing electrodes lie over the main electrode wires of the sensing electrodes/drive electrodes, respectively. It should be noted that the auxiliary electrode wires serve to conduct the main electrode wires in each node to the drive electrode terminal portions 43 or the drive electrode terminal portions 53.

It should be noted that FIG. 7 shows the electrode pattern when dummy electrodes are not provided, but dummy electrodes may be formed between the arranged electrodes for the purpose of adjusting the change in electrostatic capacity or for the purpose of producing uniformity in a light/dark distribution within the screen, which occurs as the wiring becomes denser or finer. The dummy electrodes may also be referred to as floating, they are electrically independent and do not conduct with the electrodes, the dummy electrodes reduce parasitic capacitance between electrodes, and they prevent short circuiting produced by adjacent electrodes during high-frequency driving. It should be noted that the touch panel according to the present invention which will be described later may also be applied to an electrode pattern which comprises the dummy electrodes.

The main electrode wires forming the drive electrodes/sensing electrodes comprise electrode wires running diagonally down to the right/diagonally down to the left, and obliquely intersect the X direction and the Y direction, having an angle of inclination θd/θs in relation to the X axis. This is in order to avoid moiré(interference fringes) occurring as a result of interference with the black matrix 15a when the orientation of the electrode wires is close to the orientation of the pixels in the color filter layer 15 shown in FIG. 5. Moiréalso depends on the relationship of the black matrix 15a and the pitch (period) of the main electrode wires. Moiréis readily generated especially in the region of θd=θs=0°, 45° and 90°, so these angles are avoided, but FIG. 5 is depicted as θd=θs=45° for simplicity.

When the patterns of the drive electrodes and sensing electrodes are designed, a method in which the same pattern is provided in one node unit and the same pattern is repeated in proportion to the number of nodes, as shown in FIG. 5, while generation of moiréis avoided, involves the smallest data volume and the smallest design load.

However, as indicated above, the node size is determined by the size of the active area of the touch panel and the number of pins in the integrated circuit forming part of the touch panel, so it is not a simple matter to obtain design conditions (pitch and angle of inclination) enabling a repeat arrangement while avoiding moiré. Furthermore, conditions relating to moiréhave become more stringent due to the reduced size of nodes because of higher resolution in recent display devices, the increase in clear display devices that have not been subjected to antiglare treatment, and common design requirements for display devices having different resolutions, and there are an increasing number of cases in which it is becoming more difficult to find design conditions enabling repetition while avoiding moiré.

Meanwhile, in order to provide a design such that moiréis avoided without the use of a repeating arrangement, it is necessary to design the mesh pattern over the whole surface of the active area, so there are problems in that the data volume increases and the design load increases, which leads to higher costs and lower producibility.

SUMMARY OF THE INVENTION

The present invention is intended to solve this problem, and the object thereof lies in providing a touch panel which enables a repeat arrangement with a small design load, and also allows a mesh pattern to be designed with a high degree of freedom and does not generate moiré, and also in providing a display device comprising same.

In order to solve the abovementioned problem, the invention constitutes an electrostatic capacitive touch panel in which a plurality of drive electrodes are provided on a first surface of a transparent dielectric substrate and a plurality of sensing electrodes are provided on a second surface of the transparent dielectric substrate; the plurality of drive electrodes have a strip shape extending along a first electrode direction and are arranged at a first interval along a second electrode direction intersecting the first electrode direction;

the plurality of sensing electrodes have a strip shape extending along the second electrode direction, are arranged at a second interval along the first electrode direction, and three-dimensionally intersect each of the plurality of drive electrodes and thereby construct a plurality of nodes constituting unit regions for detecting a change in electrostatic capacity resulting from contact or proximity of an external conductor;

the drive electrodes comprise a drive electrode pattern comprising a plurality of electrode wires, and the sensing electrodes comprise a sensing electrode pattern comprising a plurality of electrode wires; and a mesh pattern having rectangular units when seen in a plan view is formed overall by the drive electrode pattern and the sensing electrode pattern, said touch panel being characterized in that within each of the nodes, the drive electrode pattern comprises a plurality of first main electrode wires constituting line segments having a linear shape extending along a first wire direction, and a plurality of first auxiliary electrode wires constituting line segments having a linear shape extending along a second wire direction that intersects the first wire direction and joining the plurality of first main electrode wires;

within each of the nodes, the sensing electrode pattern comprises a plurality of second main electrode wires constituting line segments having a linear shape extending along the second wire direction, and a plurality of second auxiliary electrode wires constituting line segments having a linear shape extending along the first wire direction and joining the plurality of second main electrode wires; and respective end points of the first main electrode wires and the second main electrode wires are connected to end points of the closest first main electrode wire and second main electrode wire in adjacent nodes, by means of connecting wires having a different angle of inclination from that of the first main electrode wires and the second main electrode wires.

In a preferred embodiment of the invention, the touch panel is characterized in that the plurality of first main electrode wires in the drive electrode pattern and the plurality of second main electrode wires in the sensing electrode pattern both constitute a plurality of parallel line segments having the same pitch; and the first main electrode wires and the second main electrode wires are both such that the first main electrode wires and the second main electrode wires within adjacent nodes are moved in parallel in the second electrode direction and the first electrode direction, respectively.

In another preferred embodiment of the invention, the touch panel is characterized in that the plurality of first main electrode wires in the drive electrode pattern and the plurality of second main electrode wires in the sensing electrode pattern both constitute a plurality of parallel line segments having a different pitch in adjacent nodes.

In yet another preferred embodiment of the invention, the touch panel is characterized in that the first wire direction of the plurality of first main electrode wires in the drive electrode pattern and the second wire direction of the plurality of second main electrode wires in the sensing electrode pattern both have different angles of inclination in relation to the first electrode direction and the second electrode direction, respectively, in adjacent nodes.

According to the invention, the aforementioned problem is further solved by a display device, which is characterized in that it comprises: a display panel for displaying information, and the touch panel according to the invention, which transmits the information displayed on the display panel.

According to the present invention, a repeat arrangement of a mesh pattern constituting electrode wires is possible in a touch panel provided with a plurality of electrodes comprising a plurality of electrode wires, so the design load is reduced and a high degree of freedom in the pattern design is possible, and therefore it is possible to obtain a touch panel in which moiré is not generated, and to obtain a display device comprising same.

DESCRIPTION OF THE PREERRED EMBODIMENTS

Figure 1:
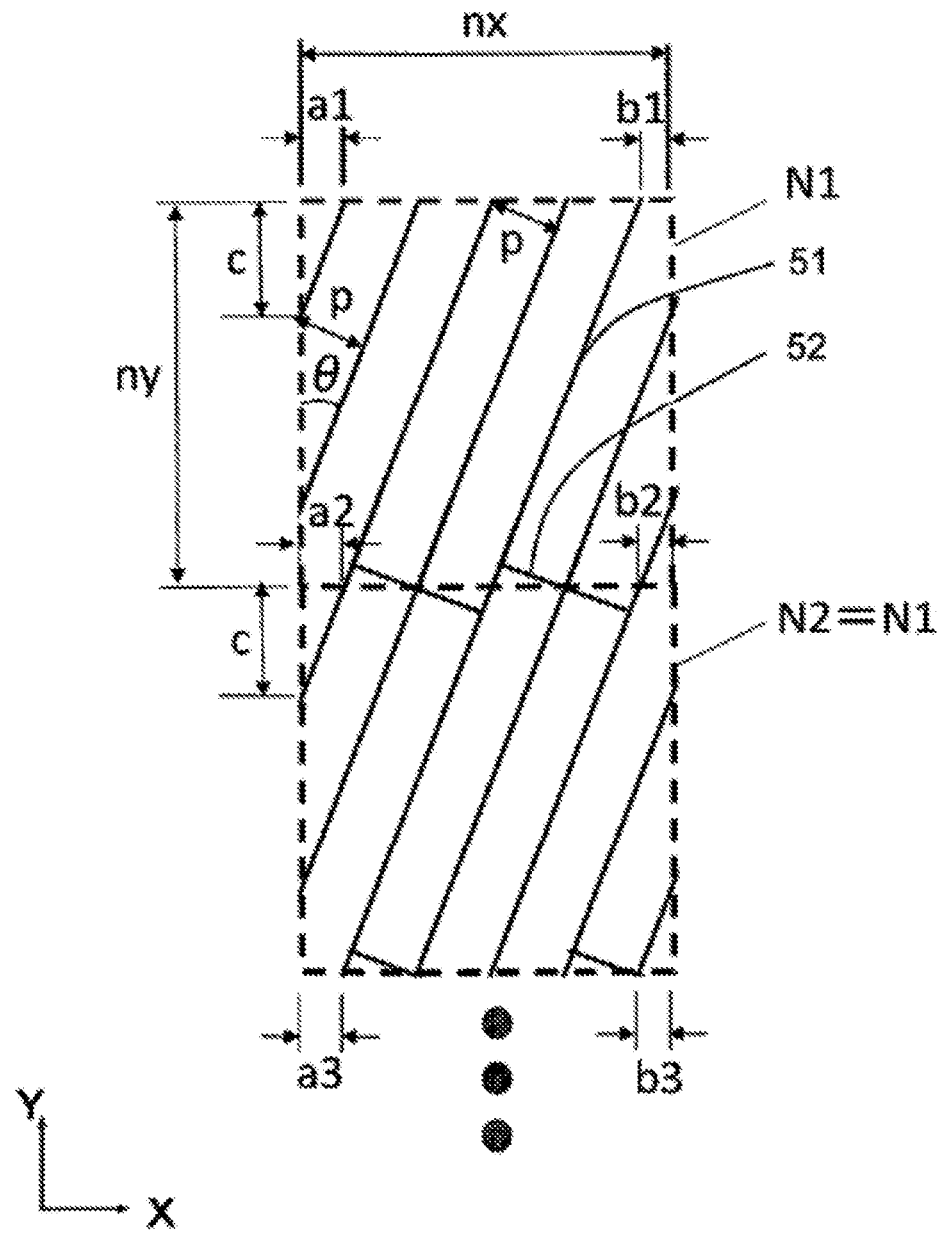
FIG. 1 is a plan view to illustrate the reason for which an arrangement of electrode wires in which the same pattern is repeated in a one-node unit is subject to constraints in terms of pitch and angle of inclination.

Modes of embodiment of the touch panel and display device comprising same according to the present invention will be described below with the aid of the drawings, and constituent elements which are the same bear the same reference symbols unless there is a reason otherwise based on practical convenience. Furthermore, the size and proportions of constituent elements may be exaggerated in the drawings in order to make the drawings easier to understand, and the number of constituent elements may also be reduced in the drawings. Furthermore, the present invention is not limited to the following modes of embodiment without any other modification, and the present invention may be embodied in variant forms provided that such forms do not depart from the substance of the present invention.

Figure 6A:
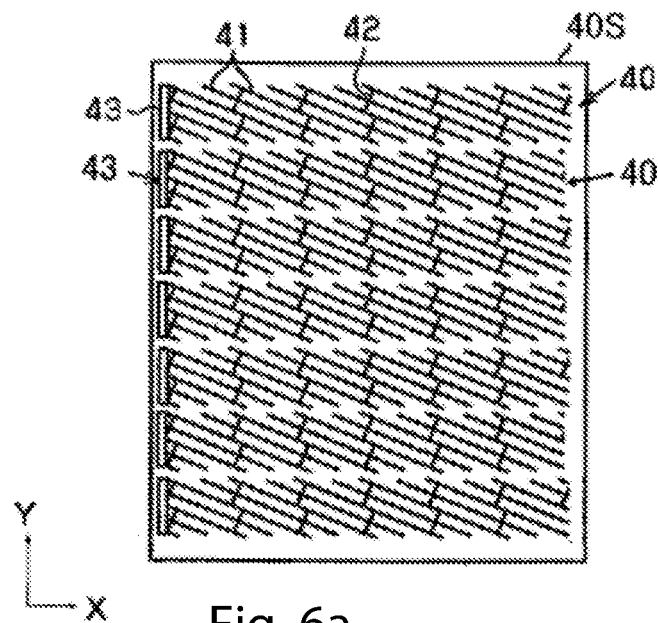
FIG. 6a is a plan view to illustrate a pattern of electrode wires of drive electrodes in a touch panel sensor according to the prior art.
Figure 6B:
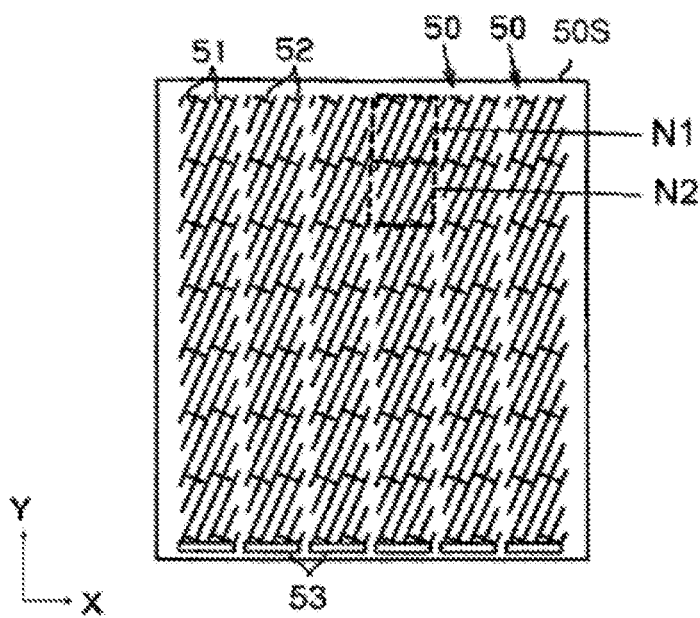
FIG. 6b is a plan view to illustrate a pattern of electrode wires of sensing electrodes, in a touch panel sensor according to the prior art.

The reason for which an arrangement of electrode wires in which the same pattern is repeated in one node unit is subject to constraints in terms of pitch and angle of inclination, in accordance with the prior art, will be described first of all with the aid of FIG. 1. FIG. 1 shows the nodes N1 and N2 of the sensing electrodes in FIG. 6b, and the nodes thus have exactly the same size and shape and are designed in such a way that the same pattern is repeated in proportion to the number of nodes, where one node is a unit.

The following conditions are essential in order to enable a design such as in FIG. 1.

1) Sections formed by the main electrode wires at the node boundary have a relationship of a1=a2=a3= . . . , b1=b2=b3= . . .
2) If the length of the node in the X direction is nx, the length in the Y direction is ny, the pitch of the main electrode wires is p, and the angle of inclination of the main electrode wires in relation to the Y axis is θ, then the following relationship is established.

$$a1+b1+4 \times p/\cos(\theta)=nx$$

$$2 \times p/\sin(\theta)=ny$$

A constraint exists in that the pitch p and angle of inclination θ are not independent, and moreover they must satisfy the relationship with the node lengths nx, ny in the equation above. As indicated above, the node size is determined by the size of the active area of the touch panel and the number of pins in the integrated circuit forming part of the touch panel, and because of higher resolution etc. in recent display devices, it is not a simple matter to find design conditions that will satisfy the abovementioned equation while avoiding moiré. The constraint of conforming to the equation above still exists if there are a plurality of repeat units, while at the same time the data volume increases, which is disadvantageous.

Figure 7:
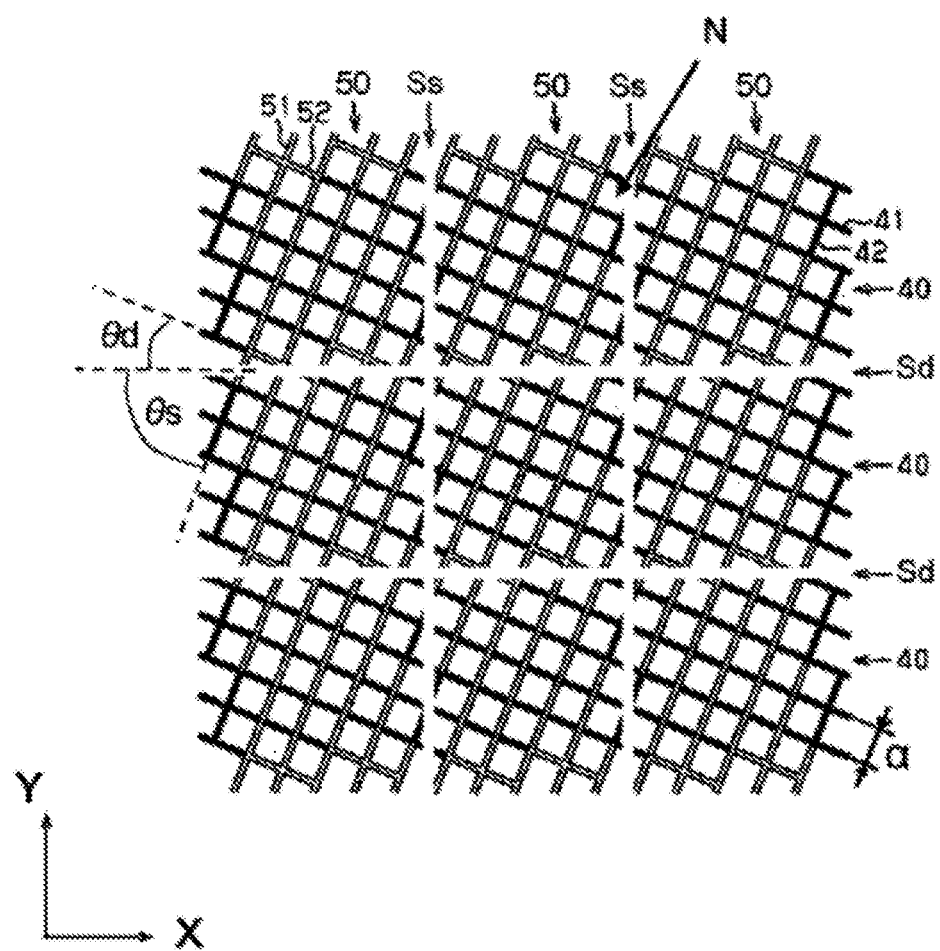
FIG. 7 is a plan view showing a mesh pattern formed by a combination of FIG. 6a and FIG. 6b.

The touch panel according to the present invention will be described below with the aid of FIG. 2a-4. It should be noted that in the claims of this application, the X direction in which the drive electrodes extend in a strip shape is referred to as a first electrode direction, the Y direction in which the sensing electrodes extend in a strip shape is referred to as a second electrode direction, main electrode wires of the drive electrodes are referred to as first main electrode wires, the length direction thereof is referred to as a first wire direction, auxiliary electrode wires of the drive electrodes are referred to as first auxiliary electrode wires, and the length direction thereof is referred to as a second wire direction. The main electrode wires/auxiliary electrode wires of the drive electrodes lie over the direction of auxiliary electrode wires/main electrode wires of the sensing electrodes, so the length direction of the main electrode wires (second main electrode wires) of the sensing electrodes is the second wire direction, and the length direction of the auxiliary electrode wires (second auxiliary electrode wires) of the sensing electrodes is the first wire direction. Furthermore, an inter-drive-electrode region Sd (see FIG. 5 and FIG. 7) is referred to as a first interval, and an inter-sensing-electrode region Ss is referred to as a second interval.

Figure 2A:
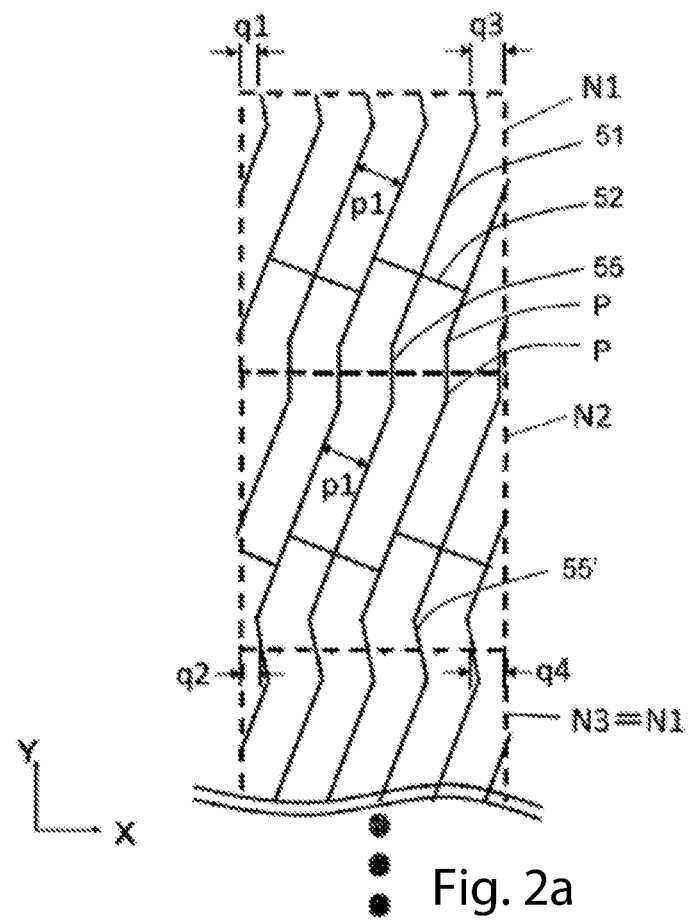
FIG. 2a is a plan view to illustrate an example of pattern design of electrode wires according to a first mode of embodiment of a touch panel of the present invention.
Figure 2B:
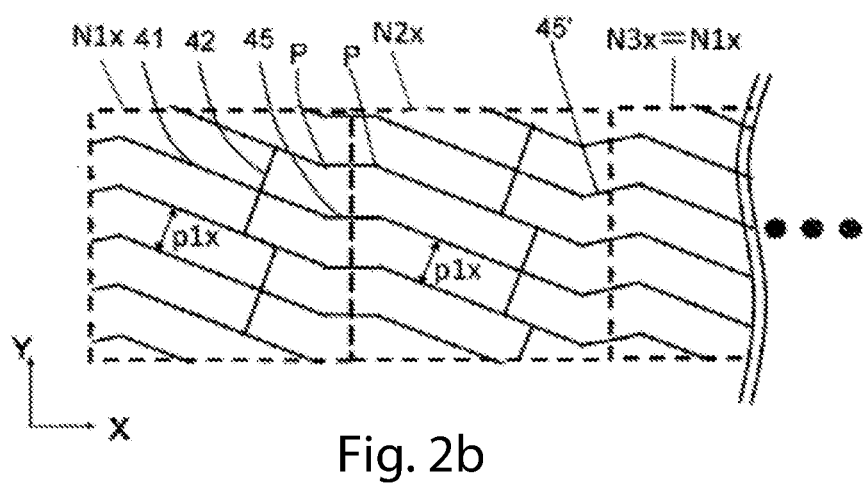
FIG. 2b is a plan view to illustrate an example of pattern design of electrode wires according to a first mode of embodiment of a touch panel of the present invention.

FIG. 2a is a plan view to illustrate an example of pattern design of electrode wires according to a first mode of embodiment of a touch panel of the present invention. FIG. 2a shows the electrode wires of the sensing electrodes and FIG. 2b shows the electrode wires of the drive electrodes, with the latter simply being a rotation of the former through 90°, so the following description relates to the sensing electrodes in FIG. 2a. (The sensing electrodes will likewise also be described in relation to FIGS. 3 and 4.)

FIG. 2a shows the nodes N1 and N2, and additionally N3, of the same sensing electrodes as in FIG. 1, but unlike FIG. 1, the electrode wires of N2 and N1 do not have the same shape, rather the main electrode wires 51 and the auxiliary electrode wires 52 of N2 are such that the electrode wires of Ni are moved in parallel in the X direction. Furthermore, the auxiliary electrode wires 52 are present within the node rather than being at the node boundary portion. Connecting wires 55, 55' joining the main electrode wires of N1 and N2 are present at the boundary portion. In other words, respective end points P of the main electrode wires are connected to end points P of the closest main electrode wire in the adjacent nodes by means of the connecting wires which have a different angle of inclination from that of the main electrode wires. It does not necessarily have to be the "closest" main electrode wire which is connected, but the lengths of the connecting wires 55, 55' should be the minimum required length, so it is preferably the closest main electrode wire which is connected.

In the design example of FIG. 2a, the nodes N3 and N1 are the same (N3=N1), and this continues subsequently as N4=N2, etc., with all of the odd-numbered nodes and all of the even-numbered nodes being the same. In other words, taking two nodes as a unit, the design in FIG. 2a involves the abovementioned units being repeated proportionately with half the number of nodes, where sections formed at the node boundary by the connecting wires 55, 55' are such that q1=q2, q3=q4, etc. When there is an odd number of nodes the final node should be the same as N1. In the pattern design of the electrode wires of the touch panel according to the present invention, the number of nodes constituting a repeat unit is M nodes, which is two or greater, rather than one node as in the prior art. If the number of nodes is not a multiple of M, the extra nodes should be the same nodes in proportion to the extra number, in succession from N1.

The main electrode wires between the M nodes are connected by means of connecting wires. The connecting wires should connect end points of the closest main electrode wires, and the angle of inclination thereof differs from the angle of inclination of the main electrode wires, and any angle may be adopted. By introducing a parameter which can be freely chosen in this way, this produces a degree of freedom in designing the electrode wire pattern. That is to say, the distance of parallel movement may also be any distance, and there is no longer a constraint in terms of the section dimensions in that it is necessary for a1=a2=a3= . . . , b1=b2=b3= . . . at all of the node boundaries when a single node is repeated as in the prior art (see FIG. 1).

When there are two nodes constituting a repeat unit, as in FIG. 2a, there are two types of connecting wires 55, 55', and when there are M nodes, there are generally M types of connecting wires. The number of nodes M constituting a repeat unit is two or greater and the data volume is smaller when this number is smaller, which is advantageous. The number of nodes is preferably two or greater but the minimum possible, according to the resolution specification etc. of the display device in question.

Figure 3:
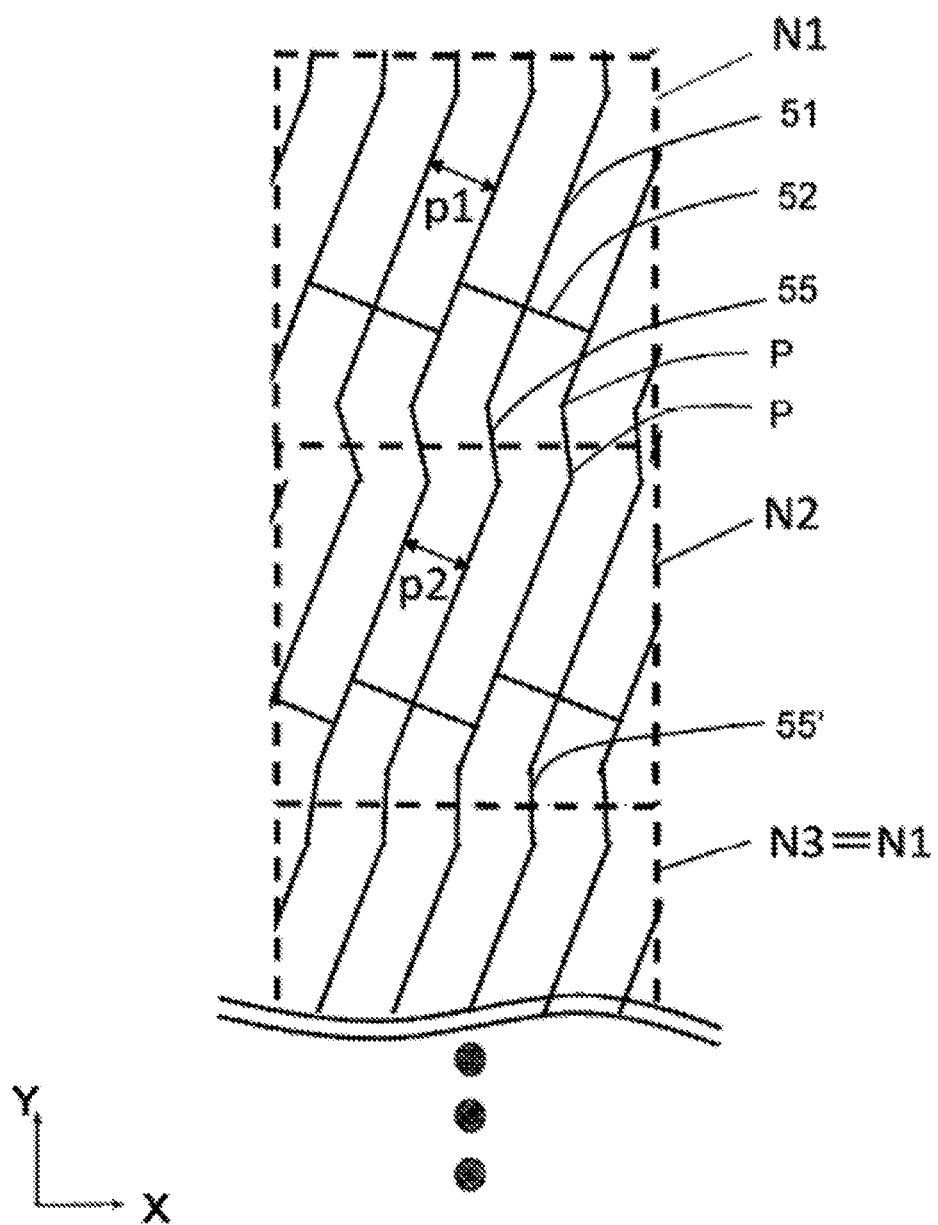
FIG. 3 is a plan view to illustrate an example of pattern design of electrode wires according to a second mode of embodiment of a touch panel of the present invention.

FIG. 3 is a plan view to illustrate an example of pattern design of electrode wires according to a second mode of embodiment of a touch panel of the present invention, and depicts the electrode wires of the sensing electrodes. In the design example of FIG. 3, the electrode wires of N2 are not set by parallel movement of the electrode wires of N1, rather a pitch p2 of the electrode wires of N2 differs from a pitch p1 of the electrode wires of N1. The configuration is otherwise the same as in FIG. 2 relating to the first mode of embodiment.

In the design example of FIG. 3, the main electrode wires of each node are connected to the closest main electrode wires of each adjacent node by means of the connecting wires 55, 55'. The connecting wires may have any angle of inclination, in the same way as in the first mode of embodiment, so the main electrode wires in this example may also have any pitch, which provides versatility, and the conditions of constraints including the pitch are relaxed while a wider range of conditions may be selected to avoid moiré.

Figure 4:
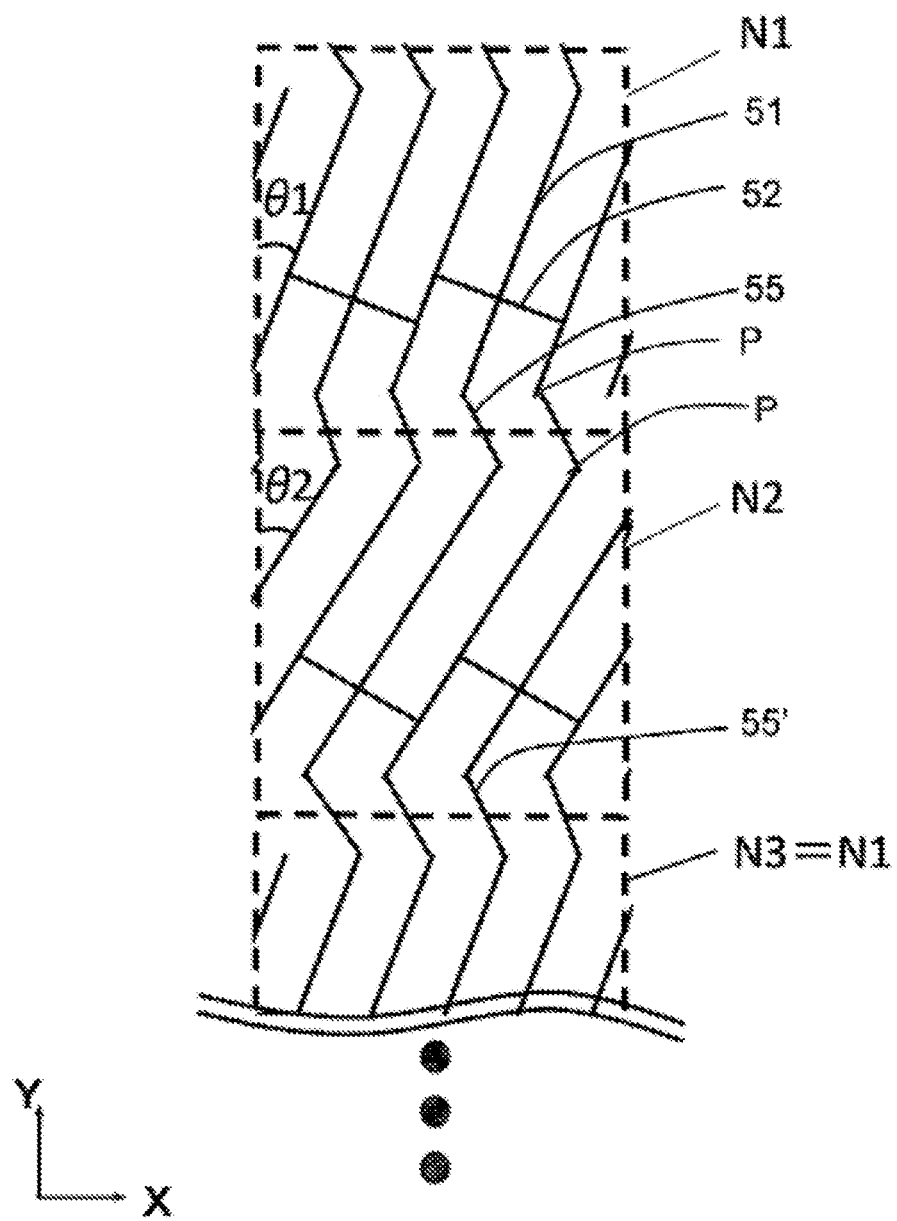
FIG. 4 is a plan view to illustrate an example of pattern design of electrode wires according to a third mode of embodiment of a touch panel of the present invention.
Figure 5:
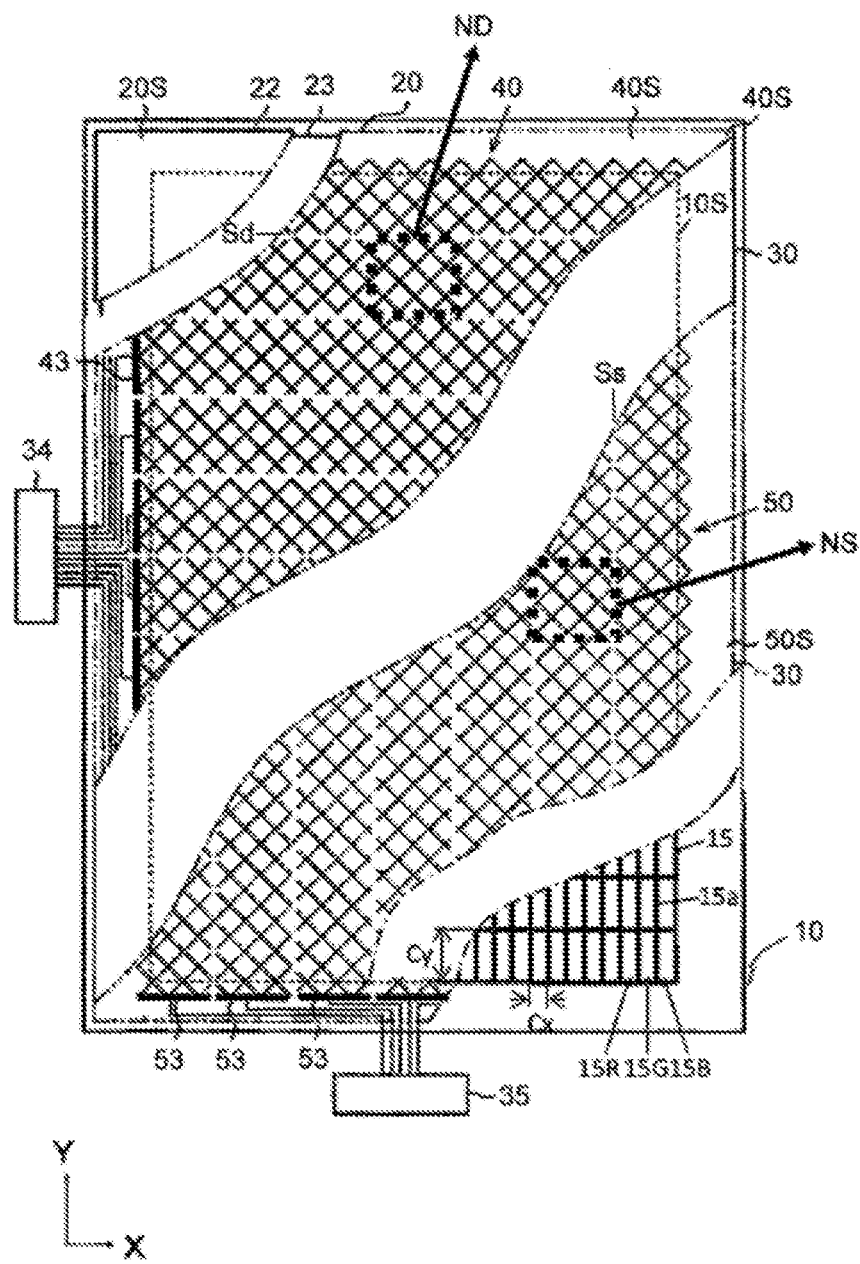
FIG. 5 is a plan view illustrating the configuration of a display device equipped with a touch panel sensor according to the prior art.

FIG. 4 is a plan view to illustrate an example of pattern design of electrode wires according to a third mode of embodiment of a touch panel of the present invention, and shows the electrode wires of the sensing electrodes. In the design example of FIG. 4, the angle of inclination θ2 of the main electrode wires of N2 differs from the angle of inclination θ1 of the main electrode wires of N1, unlike in the first mode of embodiment. The configuration is otherwise the same as in FIG. 2 relating to the first mode of embodiment.

In the design example of FIG. 4 also, the main electrode wires of each node are connected to the closest main electrode wires of each adjacent node by means of the connecting wires 55, 55'. The connecting wires may have any angle of inclination, in the same way as in the first mode of embodiment, so the main electrode wires in this example may also have any angle of inclination, which provides versatility, and the conditions of constraints including the angle of inclination are relaxed while a wider range of conditions may be selected to avoid moiré.

As described above, versatility can be imparted to the pattern designs of the electrode wires according to the first, second and third modes of embodiment in regard to the relationship of the section dimensions at the node boundaries, and the pitch and angle of inclination of the electrode wires. It is therefore possible to relax the conditions of constraint including the size of the active area and the size of the nodes which is affected by the number of pins in the integrated circuit, while a wider range of conditions may be selected to avoid moiré, and it is possible to select the optimum combination of pitch and angle to avoid moiré. All of these constitute an effect which is produced by connecting main electrode wires between a plurality of nodes using connecting wires having any angle of inclination.

The pattern designs of the electrode wires according to the first, second and third modes of embodiment may also be implemented in combination, rather than individually, and in addition to a combination of the first mode of embodiment and the second mode of embodiment. The distance of parallel movement, the amount of change in pitch and the amount of change in angle of inclination are all preferably as small as possible between adjacent nodes, provided that the advantage of the present invention is demonstrated. This is because there is a risk of variation in detection accuracy of contact position between the nodes. It should be noted that the pitch has been depicted in an exaggerated manner in FIG. 2a-4 also for the sake of illustrating the form of the electrode wires, and the number of electrode wires within the actual nodes is far greater than the number depicted, and the lengths of the connecting wires are accordingly far shorter than the length depicted, so the effect of introducing the connecting wires on the capacity and resistance value of the touch panel sensor is very small.

A specific design method including the connecting wires will be described in regard to the sensing electrodes. For example, when the number of nodes constituting a repeat unit is two, a node region is first of all established in a two-dimensional coordinate range and coordinates ($x_i$, $y_i$) at both ends of an $i^{th}$ main electrode wire within a first node are established, after which coordinates at both ends of a main electrode wire within a second node are obtained as follows.

When there is parallel movement by +a in the X direction: ($x_i$+a, $y_i$)

When the pitch is changed by Δp: ($x_i$+Δp·Sin θ, $y_i$+Δp·Cos θ) θ is the angle of inclination of the main electrode wires.

When the angle of inclination is changed by Δθ: ($x_i$·Sin Δθ, $y_i$·Cos Δθ) and this is repeated for each two-node unit. After this, end points having the closest distance are connected between adjacent nodes by the connecting wires. This algorithm should be implemented while varying a, p, θ to obtain the optimum conditions for avoiding moiré. The same also applies when the number of nodes constituting a repeat unit is M.

As described above, in the touch panel according to the present invention, connecting wires are introduced to connect main electrode wires between adjacent nodes, so it is possible to employ a small number of nodes of two or more as the repeat units, with parallel movement, pitch and angle of inclination of electrode wires in adjacent nodes being varied. It is therefore possible to achieve a pattern design having a small design load and a high degree of freedom because a repeat arrangement of the mesh pattern constituting the electrode wires is possible, so it is possible to obtain a touch panel in which moiré is not produced.

The display device according to the present invention is provided with a display panel comprising a liquid crystal panel, organic EL panel, LED panel or electronic paper, etc., and the touch panel according to the present invention which transmits the information displayed on said display panel.

What is claimed is:

1. An electrostatic capacitive touch panel in which a plurality of drive electrodes are provided on a first surface of a transparent dielectric substrate and a plurality of sensing electrodes are provided on a second surface of the transparent dielectric substrate;

the plurality of drive electrodes have a strip shape extending along a first electrode direction and are arranged at a first interval along a second electrode direction intersecting the first electrode direction;

the plurality of sensing electrodes have a strip shape extending along the second electrode direction, are arranged at a second interval along the first electrode direction, and three-dimensionally intersect each of the plurality of drive electrodes and thereby construct a plurality of nodes constituting unit regions for detecting a change in electrostatic capacity resulting from one of the group comprising contact and proximity of an external conductor;

the drive electrodes comprise a drive electrode pattern comprising a plurality of electrode wires, and the sensing electrodes comprise a sensing electrode pattern comprising a plurality of electrode wires; and a mesh pattern having rectangular units when seen in a plan view is formed overall by the drive electrode pattern and the sensing electrode pattern, wherein within each of the nodes, the drive electrode pattern comprises a plurality of first main electrode wires constituting line segments having a linear shape extending along a first wire direction, and a plurality of first auxiliary electrode wires constituting line segments having a linear shape extending along a second wire direction that intersects the first wire direction and joining the plurality of first main electrode wires;

wherein within each of the nodes, the sensing electrode pattern comprises a plurality of second main electrode wires constituting line segments having a linear shape extending along the second wire direction, and a plurality of second auxiliary electrode wires constituting line segments having a linear shape extending along the first wire direction and joining the plurality of second main electrode wires; and wherein respective end points of the first main electrode wires and the second main electrode wires are connected to end points of the closest first main electrode wire and second main electrode wire in adjacent nodes, by means of connecting wires having a different angle of inclination from that of the first main electrode wires and the second main electrode wires.

2. The touch panel according to claim 1, wherein the plurality of first main electrode wires in the drive electrode pattern and the plurality of second main electrode wires in the sensing electrode pattern both constitute a plurality of parallel line segments having the same pitch; and the first main electrode wires and the second main electrode wires are both such that the first main electrode wires and the second main electrode wires within adjacent nodes are moved in parallel in the second electrode direction and the first electrode direction, respectively.

3. The touch panel according to claim 1, wherein the plurality of first main electrode wires in the drive electrode pattern and the plurality of second main electrode wires in the sensing electrode pattern both constitute a plurality of parallel line segments having a different pitch in adjacent nodes.

4. The touch panel according to claim 1, wherein the first wire direction of the plurality of first main electrode wires in the drive electrode pattern and the second wire direction of the plurality of second main electrode wires in the sensing electrode pattern both have different angles of inclination in relation to the first electrode direction and the second electrode direction, respectively, in adjacent nodes.

5. A display device wherein it comprises: a display panel for displaying information, and the touch panel according to claim 1, which transmits the information displayed on the display panel.

* * * * *